UNITED STATES PATENT OFFICE

2,004,994
AMIDINES

John Lee, Zurich, Switzerland, assignor to E. R. Squibb & Sons, New York, N. Y., a corporation of New York No Drawing. Application September 6, 1933, Serial No. 688,359

4 Claims. (Cl. 260—105)

This invention relates to, and has for its object the provision of, certain new compounds, useful as therapeutic agents.

Compounds of this invention comprise amidines having the general formula

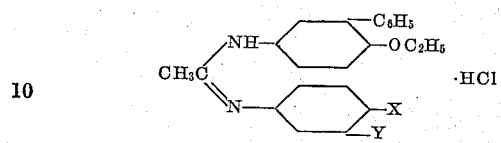

wherein X represents ethoxy or carbethoxy and Y represents hydrogen or phenyl.

Example 1

A compound having the formula

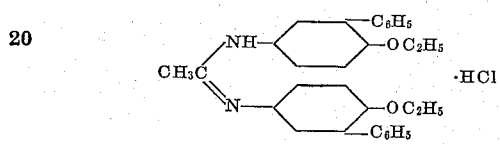

may be prepared as follows:

4.6 g. phosphorus pentachloride is dissolved in 50 cc. dry benzol; 4.9 g. 2-ethoxy 5-acetylamino diphenyl and 4.8 g. 2-ethoxy 5-amino diphenyl are added to the cooled solution; the mixture is refluxed for six hours; the benzol is distilled off, and the residue taken up in 20 cc. alcohol; precipitation is effected with 20 cc. ammonia water; the separated oil is extracted with ether; the ethereal solution is dried, and saturated with dry hydrogen chloride; after an hour the desired compound separates out as a microcrystalline white powder, which on filtration, washing with ether, and drying, is almost entirely insoluble in cold water, is slightly hydrolyzed in hot water, is soluble in alcohol, changes color at about 110° and melts with decomposition at 120–125°.

Example 2

A compound having the formula

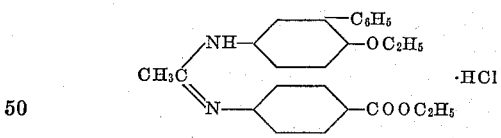

may be prepared as follows:

4.6 g. phosphorus pentachloride is dissolved in 50 cc. dry benzol and cooled; 4.9 g. 2-ethoxy 5-acetylamino diphenyl is dissolved in the solution; 3.3 g. ethyl-para-amino benzoate is added; the mixture is refluxed for three hours; the solvent is distilled off; the residue is taken up in 15 cc. absolute alcohol; ammonia water is added; the oily precipitate is extracted with ether and dried; dry hydrogen chloride is introduced; and the desired compound forms as an oily precipitate which on drying in air becomes a plastic mass.

Example 3

A compound having the formula

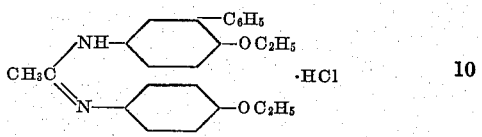

may be prepared similarly by the interaction of 2-ethoxy 5-acetylamino diphenyl and para-ethoxy anilin.

Example 4

A compound having the formula

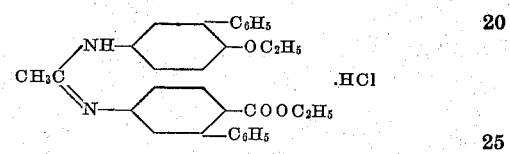

may be prepared similarly by the interaction of 2-ethoxy 5-acetyl amino diphenyl and 2-carbethoxy 5-amino diphenyl.

I claim:

1. A compound having the formula

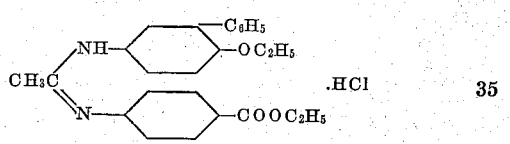

2. A compound having the formula

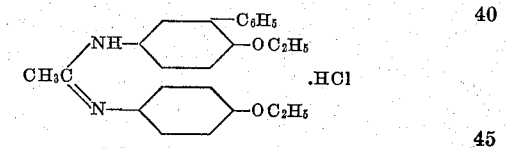

3. A compound having the formula

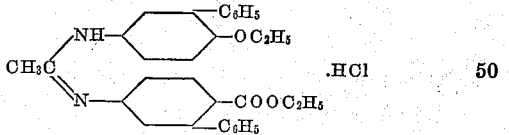

4. Compounds selected from the group consisting of N-(2-ethoxy-5-xenyl) N'-(p-phenetyl) acetamidine; N, N'-di-(2-ethoxy-5-xenyl) acetamidine: N-(2-ethoxy-5-xenyl) N'-(p-carbethoxy-phenyl) acetamidine; and N-(2-ethoxy-5-xenyl) N'-(2-carbethoxy-5-xenyl) acetamidine.

JOHN LEE.